US007940699B2

(12) United States Patent
Acharya et al.

(10) Patent No.: US 7,940,699 B2
(45) Date of Patent: May 10, 2011

(54) SPANNING TREE GENERATION FOR SUPPORTING PERFORMANCE-GUARANTEED SERVICES OVER CIRCUIT-SWITCHED NETWORK

(75) Inventors: Swarup Acharya, New Providence, NJ (US); Bhawna Gupta, Whitehouse Station, NJ (US); Pankaj Risbood, Roselle, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1494 days.

(21) Appl. No.: 11/078,033

(22) Filed: Mar. 11, 2005

(65) Prior Publication Data

US 2006/0203745 A1    Sep. 14, 2006

(51) Int. Cl.
*H04L 12/28* (2006.01)
*G01R 31/08* (2006.01)

(52) U.S. Cl. ........ 370/256; 370/230; 370/408; 370/539; 709/233; 709/224; 375/257

(58) Field of Classification Search .................. 370/254, 370/255, 256, 238, 395.53, 230, 408, 487, 370/539, 437; 709/233, 224; 375/257
See application file for complete search history.

(56) References Cited

U.S. PATENT DOCUMENTS

| | | | | | |
|---|---|---|---|---|---|
| 4,320,520 | A | * | 3/1982 | Graham | 375/257 |
| 5,581,555 | A | * | 12/1996 | Dubberly et al. | 370/487 |
| 5,881,050 | A | * | 3/1999 | Chevalier et al. | 370/230 |
| 5,886,643 | A | * | 3/1999 | Diebboll et al. | 709/224 |
| 6,151,327 | A | * | 11/2000 | Sofman et al. | 370/437 |
| 6,310,883 | B1 | * | 10/2001 | Mann et al. | 370/408 |
| 7,046,671 | B2 | * | 5/2006 | Chang et al. | 370/395.1 |
| 7,246,172 | B2 | * | 7/2007 | Yoshiba et al. | 709/233 |
| 7,301,912 | B2 | * | 11/2007 | Hong et al. | 370/256 |
| 2002/0181499 | A1 | * | 12/2002 | Kfir et al. | 370/466 |
| 2005/0008014 | A1 | * | 1/2005 | Mitra et al. | 370/392 |
| 2005/0008042 | A1 | * | 1/2005 | Rouaud | 370/539 |
| 2005/0063321 | A1 | * | 3/2005 | Imai | 370/256 |
| 2005/0141526 | A1 | * | 6/2005 | Green et al. | 370/401 |
| 2005/0152289 | A1 | * | 7/2005 | Nagata et al. | 370/256 |
| 2006/0209886 | A1 | * | 9/2006 | Silberman et al. | 370/466 |

OTHER PUBLICATIONS

T.C. Hu, "Optimum Communication Spanning Trees," SIAM Journal on Computing, vol. 3, No. 3, pp. 188-195, Sep. 1974.

(Continued)

*Primary Examiner* — Aung S Moe
*Assistant Examiner* — Jamal Javaid
(74) *Attorney, Agent, or Firm* — Ryan, Mason & Lewis, LLP

(57) ABSTRACT

Techniques are disclosed for generation of spanning trees that support provision of performance-guaranteed services over a circuit-switched network such as, for example, an optical-based network. For example, a technique for generating a spanning tree for use in forwarding Ethernet-based data in a circuit-switched network comprises the following steps/operations. Input information is obtained. The input information comprises a representation of the network, a set of Ethernet-enabled nodes in the network, and a set of demands. A spanning tree is computed based on at least a portion of the input information such that the spanning tree substantially satisfies one or more performance requirements (e.g., one or more bandwidth requirements) associated with the set of demands. Advantageously, in one embodiment, such techniques may provide for generation of spanning trees for use in supporting bandwidth-guaranteed Ethernet services such as E-LAN over a SONET (and SDH) network.

19 Claims, 6 Drawing Sheets

(A) ORIGINAL NETWORK (B) SHORTEST PATH TREE (C) ILP TREE (D) VC TREE

OTHER PUBLICATIONS

T. Radzik, "Fast Deterministic Approximation for the Multicommodity Flow Problem," Symposium on Discrete Algorithms, Proceedings of the Sixth Annual ACM-SIAM Symposium on Discrete Algorithms, (SODA), pp. 486-492, 1995.

R. Santitoro, "Metro Ethernet Services—A Technical Overview," Metro Ethernet Forum, http://www.metroethernetforum.org/PDF_Documents/metro-ethernet-services.pdf, Apr. 2003, pp. 1-19.

A. Agrawal et al., "When Trees Collide: An Approximation Algorithm For The Generalized Steiner Problem On Networks," Proceedings of the 23nd Annual ACM Symposium on Theory of Computing, 1991, pp. 134-144.

A. Agrawal et al., "When Trees Collide: An Approximation Algorithm For The Generalized Steiner Problem On Networks," Brown University Department of Computer Science Tech Report CS-90-32, Jun. 1994, reprinted in SIAM Journal on Computing, 1995, pp. 440-456, vol. 24.

D. Banerjee et al., "Wavelength-Routed Optical Networks: Linear Formulation, Resource Budgeting Tradeoffs, and a Reconfiguration Study," IEEE/ACM Transactions on Networking, Oct. 2000, pp. 598-607, vol. 8, Issue 5.

A. Narula-Tam et al., "Survivable Routing Of Logical Topologies In WDM Networks," Proceedings of the Twentieth Annual Joint Conference of the IEEE Computer and Communications Societies (INFOCOM 2001), pp. 348-357, 2001, vol. 1.

B. Yang et al., "A Tree Building Technique for Overlay Multicasting in DiffServ Domains," Proceedings of the International Conference on Internet Computing, IC '03, Jun. 2003, pp. 893-899, vol. 2, Nevada.

J.M. Kleinberg, "Single-Source Unsplittable Flow," Proceedings of the 37th Annual Symposium on Foundations of Computer Science (FOCS), 1996, pp. 1-35.

Y. Dinitz et al., "On the Single-Source Unsplittable Flow Problem," Combinatorica, Nov. 1999, pp. 17-41, vol. 19, No. 1.

S. Acharya et al., "Precomputing High Quality Routes for Bandwidth Guaranteed Traffic," IEEE Global Telecommunications Conference (GLOBECOM), Nov. 2004, pp. 1202-1207, vol. 2.

S. Acharya et al., "PESO: Low Overhead Protection for Ethernet over SONET Transport," Twenty-Third Annual Joint Conference of the IEEE Computer and Communications Societies (INFOCOM 2004), Mar. 2004, 11 pages.

* cited by examiner (A) ORIGINAL NETWORK (B) SHORTEST PATH TREE (C) ILP TREE (D) VC TREE

|   | 0 | 3 | 5 | 6 | 7 |
|---|---|---|---|---|---|
| 0 | 0 | 2 | 2 | 1 | 1 |
| 3 | 2 | 0 | 3 | 3 | 1 |
| 5 | 2 | 3 | 0 | 3 | 2 |
| 6 | 1 | 3 | 3 | 0 | 3 |
| 7 | 1 | 1 | 2 | 3 | 0 |

(A) CONTIGUOUS CONCATENATION (B) VIRTUAL CONCATENATION

SPANNING TREE ALGORITHM

*Input*: SONET network $G(V, A)$, Set of EE nodes $V' \subset V$ and a demand matrix $[d_{i,j}]$ among nodes in $V'$.
*Output*: A virtual tree $T$ spanning nodes in $V'$.

1) Choose the node $i$ s.t., $\Sigma_{j \in V'} d_{i,j}$ is max as root of tree $T$.
2) While $V' - T \neq \Phi$
   a) Find $n \in V' - T$ which can be attached to one of the nodes $n' \in T$ via path $P$ s.t., existing tree edges (paths in $G$) and new edge (formed by path $P$) all have sufficient flow to satisfy demands between $n$ and all other nodes in $T$.
   b) Failure if $n$ is not found.
   c) Connect $n$ to $n'$ via the path $P$ and update available bandwidth on all links accordingly. $P$ forms a link in virtual topology (tree $T$).
3) return $T$.

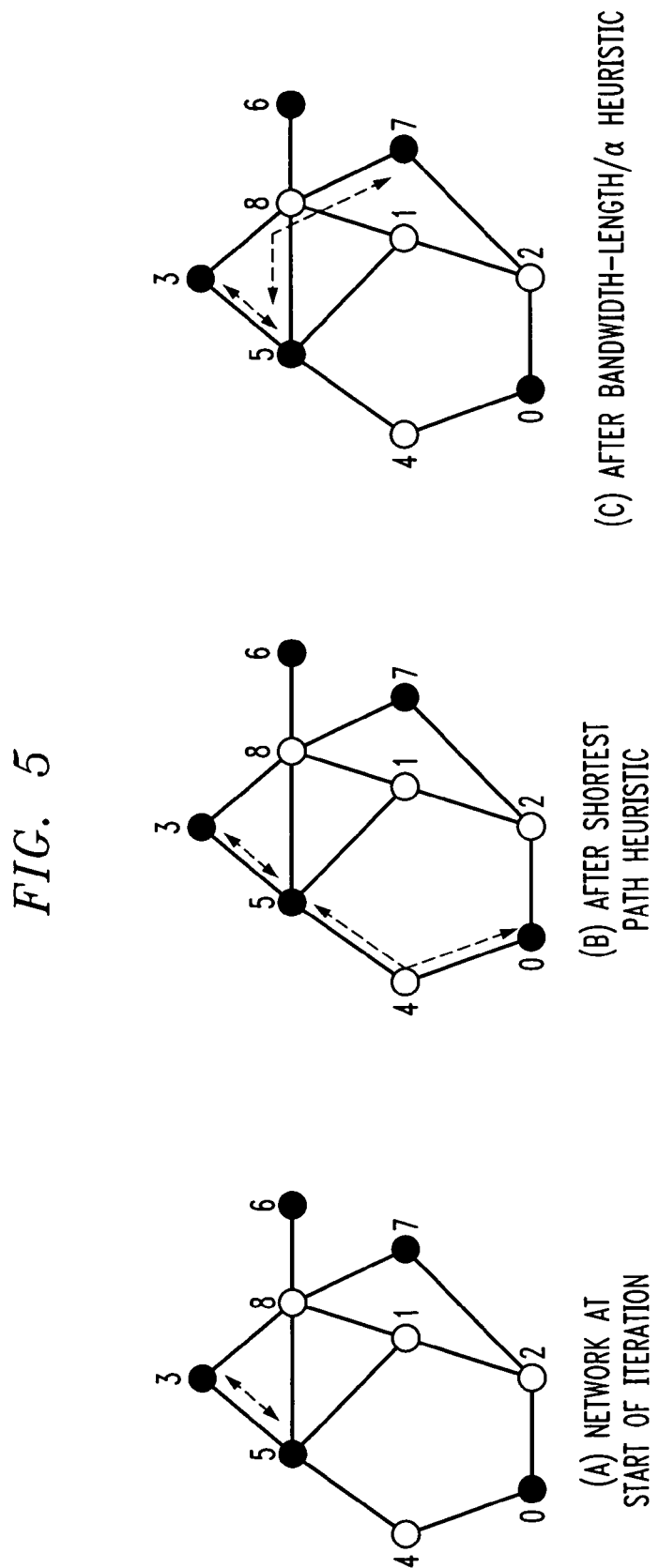

FIG. 6

SHORTEST PATH STRATEGY

*Input*: SONET network $G(V, A)$, set $V'$ of Ethernet nodes, partial tree $T_i$ s.t., $T_i \subset V'$ and demand matrix $[d_{i,j}]$.

1) $n \leftarrow (-1)$, $cost \leftarrow \infty$,
   $n' \leftarrow (-1)$, $P \leftarrow NULL$.
2) for each pair $(v_i, v_j)$ s.t., $v_i \in V' - T_i$ and $v_j \in T_i$.
   a) Find the shortest path $p_{i,j}$ connecting $v_i$ and $v_j$ s.t., the resulting tree is bandwidth feasible.
   b) Let the cost of path $p_{i,j}$ is $c_{i,j}$
   c) if $cost > c_{i,j}$
      i) $n \leftarrow v_i$, $cost \leftarrow c_{i,j}$,
         $n' \leftarrow v_j$, $P \leftarrow p_{i,j}$.
3) return $n$, $n'$, $P$.

FIG. 7

MINIMUM BANDWIDTH-LENGTH STRATEGY

*Input*: SONET network $G(V, A)$, set $V'$ of Ethernet nodes, partial tree $T_i$ s.t., $T_i \subset V'$ and demand matrix $[d_{i,j}]$.

1) $n \leftarrow (-1)$, $nbwl \leftarrow \infty$,
   $n' \leftarrow (-1)$, $P \leftarrow NULL$.
2) for each pair $(v_i, v_j)$ s.t., $v_i \in V' - T_i$ and $v_j \in T_i$.
   a) Let the sum of demands $d_{i,k} \forall k \in T$ be $bw$ and bandwidth-length product increment on edges forming the feasible virtual tree, if $v_i$ is added to $v_i$ via path $p_{i,j}$, is $bwl$.
   b) if $nbwl > bwl/bw$
      i) $n \leftarrow v_i$, $nbwl \leftarrow bwl/bw$,
         $n' \leftarrow v_j$, $P \leftarrow p_{i,j}$.
3) return $n$, $n'$, $P$.

FIG. 8

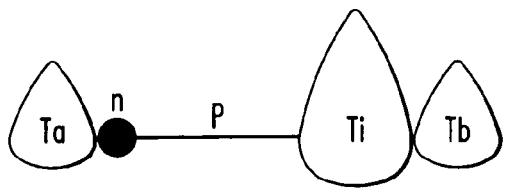

α OVER-SUBSCRIPTION STRATEGY

*Input*: SONET network $G(V, A)$, set $V'$ of Ethernet nodes, partial tree $T_i$ s.t., $T_i \subset V'$ and demand matrix $[d_{i,j}]$.

1) Let over-subscription factor be $\alpha$.
2) $n \leftarrow (-1)$, $nbwl \leftarrow \infty$,
   $n' \leftarrow (-1)$, $P \leftarrow NULL$.
3) for each pair $(v_i, v_j)$ s.t., $v_i \in V' - T_i$ and $v_j \in T_i$.
   a) Let $bwt = \Sigma_{k \in T_i} d_{i,k}$ and $bwe = \alpha \times \Sigma_{k \in V', m \notin T_i} d_{k,m}$.
   b) Find the shortest path $p_{i,j}$ connecting $v_i$ and $v_j$ s.t., it has a flow of $bwt + bwe$ or is the widest and that the resulting tree is bandwidth feasible.
   c) Let bandwidth-length product increment on edges of tree if $v_i$ is added to $v_j$ via path $p_{i,j}$ is $bwl$.
   d) if $nbwl > bwl/bw$
      i) $n \leftarrow v_i$, $nbwl \leftarrow bwl/bw$,
         $n' \leftarrow v_j$, $P \leftarrow p_{i,j}$.
4) return $n, n', P$.

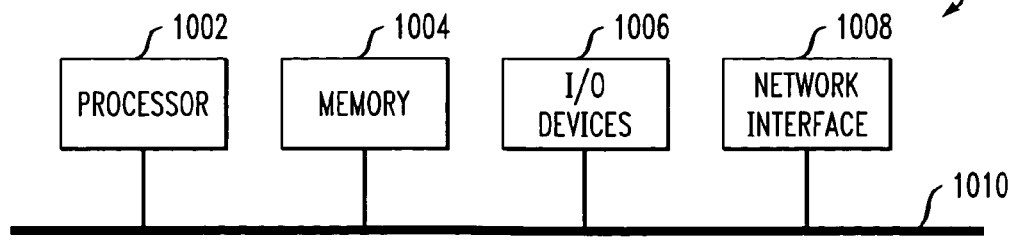

SPANNING TREE GENERATION FOR SUPPORTING PERFORMANCE-GUARANTEED SERVICES OVER CIRCUIT-SWITCHED NETWORK

FIELD OF THE INVENTION

The present invention relates generally to the field of data communication networks and, more particularly, to spanning tree generation techniques that support provision of performance-guaranteed services over a circuit-switched network such as, for example, an optical network.

BACKGROUND OF THE INVENTION

It is known that Ethernet has become the most ubiquitous networking technology in Local Area Network (LAN) environments. Given its popularity in the enterprise domain, there is a growing effort to replicate its success in telecommunications service provider networks. This has led to proposals to create next-generation Ethernet-based services across metropolitan and national Wide Area Networks (WANs).

To standardize these services, the telecommunications industry has classified them under two broad categories: (1) Ethernet Line (E-Line) services for point-to-point connectivity; and (2) Ethernet LAN (E-LAN) services for multipoint-to-multipoint (any-to-any) network connectivity. E-LANs have applications in multipoint Ethernet Virtual Private Networks (VPNs) and Transparent LAN services and is particularly advantageous because, unlike Frame Relay, E-LAN promises to provide multipoint-to-multipoint connectivity.

In order to deliver these services, some service providers have taken the approach of supporting Ethernet on their legacy Synchronous Optical Network (SONET) or Synchronous Digital Hierarchy (SDH) transport infrastructures (for simplicity herein, the word SONET will be used to refer to both SONET and SDH). Their approach aims to encapsulate Ethernet at the edge and transport it over the SONET infrastructure. Such an approach is referred to as Ethernet-over-SONET (EoS).

It is also known that a spanning tree is very important to any Ethernet network. Protocols such as IEEE (Rapid) Spanning Tree Protocol (IEEE 802.1d, 802.1w), the disclosure of which is incorporated by reference herein, are used by Ethernet nodes to select a spanning tree of the network along which to forward data frames. However, while Asynchronous Transfer Mode (ATM) and Frame Relay-based data networks deploy data services that are considered "carrier class," i.e., their services support service-level agreements (SLAs) that guarantee various performance metrics such as bandwidth and downtime, traditional enterprise Ethernet and associated spanning tree computations are merely "best effort" in nature with respect to performance considerations.

SUMMARY OF THE INVENTION

The present invention provides techniques for generation of spanning trees that support provision of performance-guaranteed services over a circuit-switched network.

For example, in one aspect of the invention, a technique for generating a spanning tree for use in forwarding Ethernet-based data in a circuit-switched network comprises the following steps/operations. Input information is obtained. The input information comprises a representation of the network, a set of Ethernet-enabled nodes in the network, and a set of demands. A spanning tree is computed based on at least a portion of the input information such that the spanning tree substantially satisfies one or more performance requirements (e.g., one or more bandwidth requirements) associated with the set of demands.

The technique may further comprise the step/operation of determining, based on the computed spanning tree, one or more physical routes comprising at least a portion of the Ethernet-enabled nodes for use in forwarding at least a portion of the Ethernet-based data.

In one embodiment, the spanning tree computation and the route determination are performed in one integrated step/operation. The integrated step/operation may generally comprise selecting a starting node from among the Ethernet-enabled nodes as a starting node, selecting another node from among the Ethernet-enabled nodes to attach to the starting node, and selecting a path in the network to connect the starting node and the other node. The integrated step/operation may also comprise iteratively selecting one or more next nodes and corresponding paths to include in the spanning tree. The node with the largest aggregate data traffic associated therewith may be selected as the starting node.

Further, the integrated spanning tree computation/route determination step/operation may further comprise selecting nodes such that the path between the nodes is the shortest path that satisfies a given bandwidth requirement. Alternatively, nodes that have the least bandwidth-length to bandwidth ratio may be selected. Still further, the integrated step/operation may further comprise providing excess bandwidth when accounting for the set of demands, wherein an excess bandwidth component may be tunable based on a subscription factor. Also, the integrated spanning tree computation/route determination step/operation may further comprise utilizing a virtual concatenation (VC) protocol to allow the Ethernet-based data associated with the set of demands to be forwarded on multiple, diverse paths.

In another embodiment, the spanning tree computation and the route determination are performed in separate steps/operations. The separate spanning tree computation step/operation may further comprise finding an optimal communication spanning tree (OCST) over a graph comprising the Ethernet-enabled nodes. The separate route determination step/operation may further comprise solving a multi-commodity flow problem. Further, the separate route determination step/operation may utilize a VC protocol to allow the Ethernet-based data associated with the set of demands to be forwarded on multiple, diverse paths.

Advantageously, in one embodiment, such techniques may provide for generation of spanning trees for use in supporting bandwidth-guaranteed Ethernet services such as E-LAN over an optical-based network such as a SONET (or SDH) network.

These and other objects, features and advantages of the present invention will become apparent from the following detailed description of illustrative embodiments thereof, which is to be read in connection with the accompanying drawings.

BRIEF DESCRIPTION OF THE DRAWINGS

FIGS. 3A and 3B show sample routing implications associated with virtual concatenation according to an embodiment of the present invention;

FIG. 4 shows a spanning tree algorithm, according to an embodiment of the present invention;

FIGS. 5A through 5C show results of operations of a spanning tree algorithm, according to an embodiment of the present invention;

FIG. 6 shows a shortest path heuristic algorithm, according to an embodiment of the present invention;

FIG. 7 shows a minimum bandwidth-length heuristic algorithm, according to an embodiment of the present invention;

FIG. 8 shows a state of a spanning tree, according to an embodiment of the present invention;

FIG. 9 shows an over-subscription-based heuristic algorithm, according to an embodiment of the present invention; and FIG. 10 shows a block diagram of a generalized hardware architecture of a computer system suitable for implementing a system for generating a spanning tree, according to an embodiment of the present invention.

DETAILED DESCRIPTION OF THE INVENTION

Figure 1:
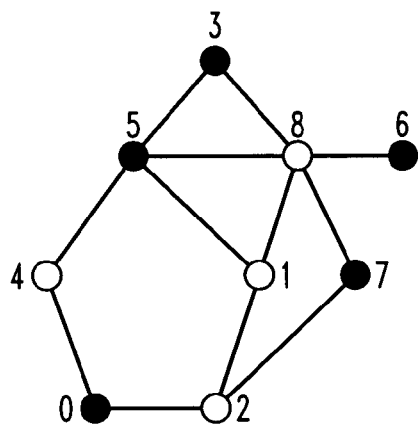
FIGS. 1A through 1D show sample EoS and spanning tree options, according to embodiments of the present invention.
Figure 1:
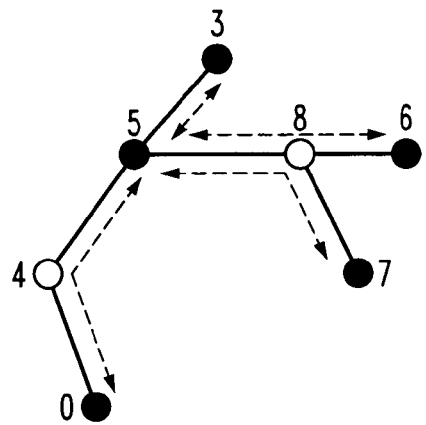
Figure 1:
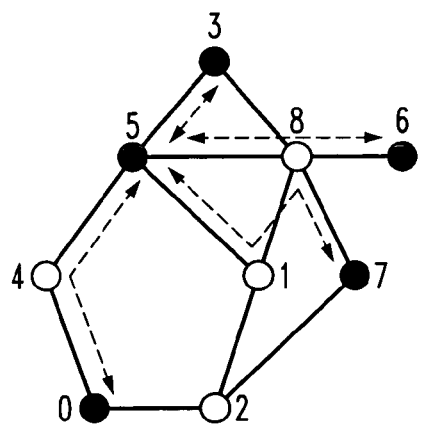
Figure 1:
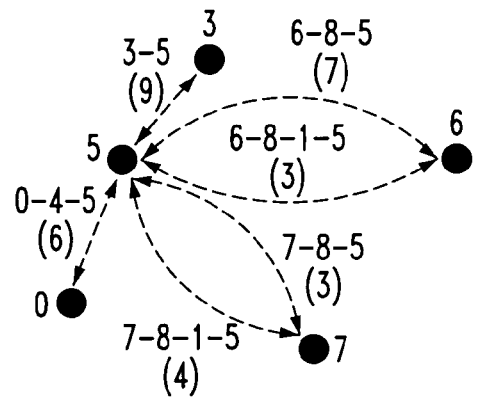

The following description will illustrate the invention in the context of exemplary E-LAN services over a SONET (SDH) network, referred to as EoS. It should be understood, however, that the invention is not necessarily limited to use with any particular type of circuit-switched network. The invention is instead more generally applicable to any circuit-switched network in which it is desirable to generate spanning trees that support performance-guaranteed services over the network.

As used herein, the term "demand" generally refers to a bandwidth request between a source node and a destination node. Further, as used herein, the term "circuit" generally refers to a path in the network, which includes at least the source node and the destination node, that satisfies a given demand.

It is realized in accordance with the invention that one of the key challenges in deploying E-LAN data services is the requirement for them to be "carrier class." In other words, a service provider is expected to support service-level agreements (SLAs) that guarantee various performance metrics such as bandwidth and downtime. For example, if a provider offers an E-LAN VPN for a bank to connect ten branches, it will be expected to meet the promised pair-wise bandwidth requirement between all pairs of branches.

As will be illustratively explained, principles of the invention provide techniques for spanning tree design in EoS networks for supporting bandwidth-guaranteed E-LAN services. It is realized in accordance with the invention that in order to satisfy bandwidth SLAs for E-LAN services, spanning tree algorithms of the invention should consider bandwidth in their computations such that a spanning tree is designed to have sufficient bandwidth along all the hops of the tree.

In a traditional data network, calculating the optimal spanning tree in accordance with such well-known algorithms as Kruskal's or Prim's algorithms takes polynomial time. However, in accordance with the invention, it is realized that incorporating bandwidth makes the problem NP-complete. A spanning tree formed in accordance with principles of the invention is referred to as a "bandwidth-endowed spanning tree" (BEST).

It should be noted that, unlike a traditional Ethernet switched network, EoS is an overlay network, i.e., Ethernet traffic rides on the underlying SONET network and the Ethernet neighbor connectivity is determined by the end-to-end paths in the SONET layer. Thus, BEST computation is both a capacitated spanning tree problem and a problem of finding the appropriate SONET connectivity with the necessary bandwidth. Further, despite being a hard problem, it is realized that exploitation of underlying topology information and leveraging new SONET protocols such as Virtual Concatenation (VC) can provide effective solutions that can be used in practice.

The remainder of the detailed description is subdivided as follows: Section I describes some illustrative principles of the SONET protocol and illustrative motivation for the BEST problem; Section II describes an illustrative formulation of the BEST problem; Section III describes illustrative spanning tree algorithms; Section IV describes an illustrative integer linear programming formulation of the BEST problem; and Section V describes an illustrative computing system that may be used to implement the spanning tree algorithms.

I. SONET Protocol and BEST Motivation

In this section, some principles on EoS and a sample network example to motivate the BEST problem are described.

The EoS approach requires the service provider to support Ethernet at the edge of the network. This is achieved by adding so-called "multi-service" SONET nodes equipped with Ethernet line cards. Such Ethernet-enabled nodes are referred to herein as EE nodes and the SONET-only nodes as SO nodes. In terms of functionality, a key difference between the two types of nodes is that, in addition to performing the traditional SONET cross-connection functionality, the EE nodes can also "switch" data traffic (i.e., behave akin to a router). The EE nodes are interconnected through the SONET nodes to create a Ethernet "virtual topology," often in a mesh or ring architecture. The spanning tree is then derived on this virtual topology.

Figures 2, 3:
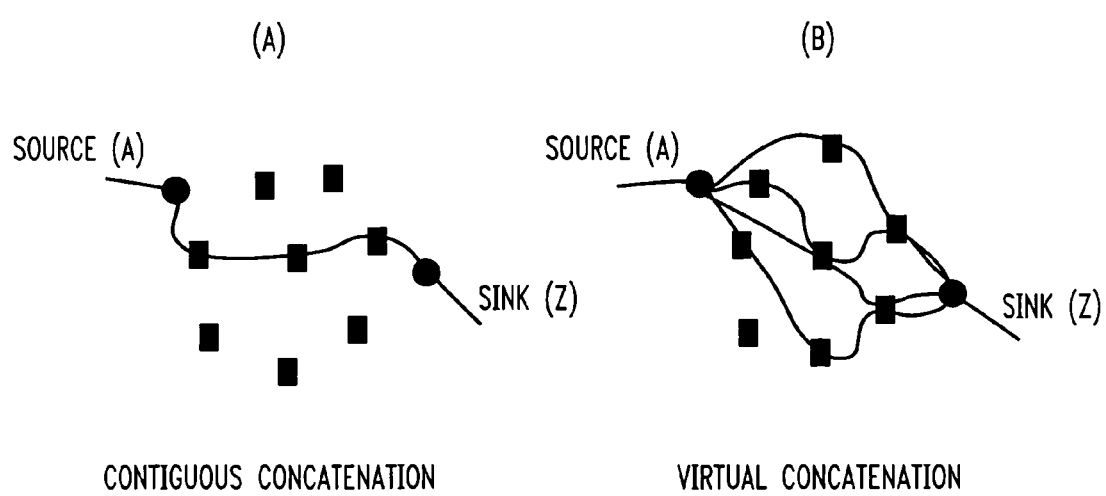
FIG. 2 shows a sample demand matrix between Ethernet nodes, according to an embodiment of the present invention.

Consider the sample 8-node network in FIG. 1A with each link having a capacity of 10 units. In this network, the dark nodes (0,3,5,6,7) are the EE nodes and the remaining four (white) nodes are the SO nodes. FIG. 2 shows the end-to-end bandwidth demand that the customer requires to be met among the EE nodes.

This example network will now be used to illustrate motivation for finding a bandwidth-endowed spanning tree. Consider a strategy that aims to find a tree utilizing the fewest number of transport hops. One such tree, shown in FIG. 1B, has the tree rooted at node 5 and the other nodes connected to it via the shortest possible path shown in the dotted lines. However, this "shortest path" tree is not valid since it overloads the link 5-8 which now has to carry all the traffic destined to nodes 6 (1+3+3+3=10 units) and 7 (1+1+2+3=7 units) from the other four nodes in the E-LAN. Note that traffic between nodes 6 and 7 traverses the 5-8 link twice since 8 is a SO node and can only be a pass-through cross-connect.

In essence, there are two challenges that need to be addressed. The first challenge is the design of the logical spanning tree and secondly, given a tree layout, mapping the logical tree edges to physical routes on the SONET network. For example, FIG. 1C shows a different physical routing of paths for the same logical tree. This routing is the output of an "ideal" integer linear programming (ILP) formulation described in Section IV below. It takes a longer three-hop path from node 5 to 7 and this creates a valid tree.

The difficulty arises since both the tree-design and routing sub-problems are NP-hard and the search space for both of them is exponential in size. For example, given n nodes in a complete graph, there are potentially $n^{n-2}$ possible ways to create a spanning tree among them. Similarly, optimal routing of the logical tree hops on the physical topology does not admit a polynomial solution. Consequently, the algorithmic challenge is to narrow down the search space so as to make practical solutions feasible. The different algorithm embodiments provided below describe alternate approaches to achieving this goal.

Finally, in the examples so far, it is implicitly assumed that all traffic between a pair of logically adjacent EE nodes can only follow a single path on the SONET layer. However, this is not necessarily the case. In order to make SONET amenable to data traffic, the Virtual Concatenation (VC) protocol has been recently added to the SONET standard. The VC protocol is described in greater detail in, for example, ITU-T standards documents G.707, the disclosure of which is incorporated by reference herein.

VC addresses the impedance mismatch problem between the synchronous transport signal (STS) rate hierarchy for voice traffic (STS-1,3,12, etc.) and the data rates (100 M, 1 G, 10 G, etc.). For example, the closest SONET rate to Gigabit Ethernet (1 Gb) is STS-48 (2.5 Gb), a 60% wastage of bandwidth. The VC protocol allows a STS-nc demand to be split into k pieces of bandwidth n/k. The source node sends traffic down these k members of a Virtual Concatenation Group (VCG) and the destination node reconstructs the data stream. Consequently, a 1 GB demand can be mapped to 21 STS-1s, imposing only a 8% overhead. More importantly, for this discussion, the standard allows each of these VCG members to be routed diversely. FIG. 3 shows the routing contrast between contiguous concatenation (the standard preceding VC) and VC showing a VCG of four members.

In the network in FIG. 1A, the shortest path tree approach of FIG. 1B failed since link 5-8 did not have sufficient capacity. However, using VC, the required traffic from 5-7 and 5-6 can be carried over two paths. FIG. 1D shows the routes in the transport layer connecting the various nodes. The paths and the bandwidth carried on each of them are shown.

Clearly, the network operator is also seeking a tree that has a low cost. While many different cost metrics may be defined, one common metric of choice is the bandwidth-length product, the number of STS-1 spans used to support the service. In this example above, both the ILP and the VC solution have a bandwidth-length cost product of 62. In fact, it can be shown that use of VC significantly improves the chances of successfully finding a tree and also produces very cost-effective trees, competitive with the off-line, "ideal" ILP formulation.

II. BEST Problem

A. Problem Definition

In this section, the problem of finding a bandwidth-endowed spanning tree for E-LAN services in a Ethernet over SONET network is defined.

BEST Definition: Given a network G (V, A) with edge capacities b: $A \rightarrow Z^+$, a subset V' of V, and bidirectional demands $d_{i,j} \in Z^+$, $\forall i, j \in V'$. The BEST problem is to find a virtual tree spanning all nodes in V' such that:

Flow splitting is only allowed on nodes in V', and,

All pairwise demands are satisfied on the tree.

The V' nodes correspond to the EE nodes that terminate Ethernet traffic and are capable of flow splitting (packet processing). The solution for BEST is to provide both the logical tree and the physical routing of paths corresponding to each logical hop. The paths among V' nodes, going through nodes in V, form edges in the Ethernet virtual topology. It is to be noted that this virtual topology, required to be a tree, need not be a tree in the underlying SONET network. For example, FIG. 1C shows that the "disjoint" virtual tree paths from nodes 5-7 and 5-6 traverse through the common node 8.

It is to be appreciated that the standard bandwidth-length product metric is used to measure the cost of the tree, though other suitable metrics may also be employed. BEST can also be formulated as a design problem whose goal is to find the minimum capacity required on each SONET link for supporting the requested E-LAN service with the least cost.

B. BEST is NP-Complete

In this section, it is shown that BEST problem is NP-complete by reducing the well-known single source unsplittable flow (SSUF) problem to an instance of BEST. SSUF is a special case of general unsplittable multi-commodity flow problem and is known to be NP-complete.

The single source unsplittable flow problem is defined as follows.

SSUF Definition: Given a graph G (V, A), with edge capacities b: $A \rightarrow Z^+$, a source vertex s and collection of sinks $t_1, \ldots, t_k$ with corresponding non-negative integer demands $p_1, \ldots, p_k$ between them. Does there exist a routing for all the demands such that each demand $p_i$ is carried on a single route from s to $t_i$?

Consider an arbitrary instance of SSUF. The set $\{s, t_1, \ldots, t_k\}$ is designated as V' (EE nodes) and the pairwise Ethernet demands $d_{s,t_i}$ are set as demand $p_i$. For all other pairs of V', the demand $d_{t_i,t_j}$ is set as zero. We now have an instance of the BEST problem.

If there exists a solution for SSUF, then that solution is by definition a star rooted at s in virtual topology over nodes in V' and thus, also a tree. Therefore, it is also a solution for BEST. Conversely, if a solution for BEST exists, then in the solution tree there exists a unique simple path from node s to any other node $t_i$ and this path also satisfies the requirement $p_i$. The path from s to any $t_i$ in virtual topology also maps to a path (not necessarily simple but can always be converted to one by removing all the loops) in graph G.

For example in the network of FIG. 1A, if 6 was the source node and BEST was as shown in FIG. 1B, the path to node 7 will contain a loop 8-5-8 but the path 6-8-7 obtained after removal of loop is acceptable for SSUF. Hence, a solution to single source unsplittable flow problem exists if a solution to BEST problem exists.

III. Spanning Tree Algorithms

In this section, algorithms are described that can be used to solve the BEST problem.

As indicated above, the BEST problem requires addressing the following two subproblems:

the logical tree design satisfying pairwise bandwidth requirements, given a tree, finding a feasible physical routing in the underlying SONET layer.

These problems can either be addressed in two independent steps or, in a single integrated step. Both these approaches are viable strategies and need to be addressed from a practical standpoint. A service provider customer may request E-LAN services one of two ways. They may simply provide the Ethernet drop points (EE nodes) and the required bandwidth matrix, leaving the provider to determine both the tree and the routing. Alternatively, in some cases the customer may already have a specific tree in mind based on internal requirements and simply want the provider to do the routing. In that case, independent solutions to the two problems are desirable and algorithms for both are presented.

A. Integrated Strategy

An integrated algorithm may utilize the well-known Prim spanning tree model enhanced to account for bandwidth requirements, edge capacity constraints and cross-connect nature of underlying network. Thus, the integrated algorithm starts with a random node, and every iteration of the algorithm grows the tree by one node. In each iteration, the node with shortest cost edge to any node already in the tree is chosen.

An embodiment of an integrated algorithm of the invention is shown in FIG. 4. As indicated, inputs to spanning tree algorithm 400 include a given SONET network G(V, A), a set of EE nodes V' ⊂ V, and demand matrix [$d_{i,j}$] among nodes V'. The output of algorithm 400 is a virtual tree T spanning nodes in V'.

As shown, the first step (Step 1) is the choice of the starting node chosen as the root. Since it impacts the solution, the node with largest aggregate traffic is chosen. This ensures that the bulk of pairwise requirements are accounted for first when the bandwidth availability is highest.

An important step (Step 2*a*) is the selection of new node (n) to add to the partial spanning tree ($T_i$) in any iteration i. Also important is the choice of node (n') in spanning tree where the new node is attached and the path (P) used to connect the two nodes. The different algorithm embodiments presented below differ in the choices they make in finding n, n' and P.

Note that if n is not found, then the algorithm fails (Step 2*b*), i.e., does not produce a solution.

Once a new node is added to the partial tree (Step 2*c*), the routing of demands originating and terminating in T is fixed. Thus, at the end of each iteration, the available bandwidth on the links in the SONET network is updated.

As a running example, consider the network of FIG. 5A, which is the output after the first iteration of the spanning tree algorithm when applied to the network of FIG. 1A. The initial node chosen is 5 because it has the largest aggregate traffic. Node 3 is the next node to be added. Note that at this stage, the set of possible (n, n') pairs is {(0,3),(0,5),(6,3),(6,5),(7,3),(7,5)}.

Presented below are different embodiments for implementing Step 2*a* of spanning algorithm 400. For each iteration i, each of the embodiments takes as input the current partial tree $T_i$ and outputs the node n that adds next and the node n' in $T_i$ to which it connects via path P.

1) Shortest Path Heuristic (SP):

This algorithm chooses the nodes n, n' and path P such that, the P connecting n and n' is the shortest path with sufficient bandwidth among all paths connecting any EE node not in tree $T_i$ to any other node in $T_i$. If there are multiple equal-cost paths, the ties are resolved arbitrarily. The algorithm (denoted as 600) is outlined in FIG. 6.

For the example network, the pairs {(0,5),(6,5),(6,3),(7,3), (7,5)} are candidates since they are all connected by 2-hop paths and have the necessary bandwidth. The first pair (0,5) is chosen and node 0 is added to node 5 via path 0-4-5. The resulting tree is shown in FIG. 5B.

2) Minimum Bandwidth-Length heuristic (BWL):

The shortest path approach is oblivious to the amount of traffic added on the tree by addition of a new node. However, every node added impacts the flow on all the edges of the tree since the traffic it originates needs to be carried. Thus, the BWL strategy adds nodes in a manner that its addition results in as little additional flow to the current edges while capturing as much traffic as possible from the demand matrix.

In order to balance these two conflicting requirements, this approach chooses the node n that has the least bandwidth-length (bwl) to bandwidth (bw) ratio. Recall that bandwidth-length is the cost metric of the tree and the bandwidth refers to the total traffic in (and out) of n. The algorithm (denoted as 700) is outlined in FIG. 7.

For the example network, for all possible connectivities (via their respective shortest paths) the tuple (n, n', bwl, bw) is {(0,5,10,4), (0,3,14,4), (6,5,15,6), (6,3,15,6), (7,5,7,3), (7,3,8,3)}. Clearly the ratio bwl/bw is smallest for connecting node 7 to node 5 via path 5-8-7 and hence it is the next node added. The resulting network is shown in FIG. 5C. In general, BWL will tend to create "bushy" trees with smaller diameters as compared to SP.

Before describing the next two algorithms, an observation is made that highlights the fundamental structure of the problem space.

Consider FIG. 8. It shows the state of the tree after the $i^{th}$ iteration of the spanning tree algorithm, with the next node n being attempted to be added to the current tree $T_i$. If n is not the last node to be added, the nodes added in subsequent iterations can be divided into two sets, $T_a$ and $T_b$, depending on which side of the edge formed by path P they lie. Thus, in the final solution, the path P has to carry the traffic emanating both from n and from nodes in $T_a$ and terminating in $T_b$ and $T_i$. The difficulty is that when n is being added, one cannot predict how the remaining nodes will be partitioned into $T_a$ and $T_b$. This is the primary factor that makes this a hard problem. So, a key algorithmic challenge for any incremental strategy is—when adding a new node n to the partial tree, what should be the bandwidth one should seek for this new logical tree link formed by P?

The first two algorithms, SP and BWL, choose a path with only enough capacity to meet the requirements between n and $T_i$. However, doing so can cause the algorithm to fail if in a later iteration, this path P turns out to have insufficient capacity.

The next two algorithms aim to avoid this problem. The first approach over-provisions bandwidth upfront and seeks to find a path P that meets this higher bandwidth requirement. The second approach uses the underlying VC protocol to lazily add bandwidth as necessary, possibly via new diverse paths that the VC protocol enables.

The following two strategies apply equally to both the SP and the BWL algorithms. For reasons of space, we present them only in the context of the BWL approach.

3) a Heuristic (BWL-α):

Consider FIG. 8 again. The traffic carried over P is sum of traffic from nodes {$T_a$, n} to ($T_i$, $T_b$). This traffic can be divided into two components—tree bandwidth (bwt), the traffic between n and nodes in $T_i$, and excess bandwidth (bwe), the traffic between {$T_a$, n} to {$T_b$} and {$T_a$} to {$T_i$}. The bwt component is known when n is chosen. The bwe component depends on how subsequently added nodes are partitioned into $T_a$ and $T_b$. If $T_a$ turns out to be Φ then bwe is traffic between n and subsequently added nodes. If $T_b$ is Φ then bwe is traffic between nodes in $T_i$ and all the other nodes. Hence, in general, bwe is a fraction of traffic between nodes in $T_i$ and V'-$T_i$.

This algorithm uses a tunable a metric to capture this fraction. As shown in FIG. 9, the algorithm (denoted as 900) is essentially the BWL algorithm (of FIG. 7) except for the following key difference. When searching for candidates for path P, it seeks paths that can support additional bandwidth due to traffic from $T_a$ (captured by the parameter bwe). Note that if a path with bandwidth bwe+bwt is not found, then the widest shortest path is chosen. When applied to the example scenario of FIG. 5A, for a subscription factor α=0.5, the new node added is 7 using path 7-8-5 which is same as solution for BWL heuristic as in FIG. 5C.

The value of fraction α is a parameter that can be varied from 0 to 1. The BWL heuristic is the special case of α=0. Note that α produces the over-provisioning behavior one would expect, i.e., it over-provisions more in the initial stages and gradually reduces as the tree grows.

4) VC Heuristic (BWL-VC):

While the BWL-α algorithm grabs the additional bandwidth upfront, the BWL-VC algorithm leverages the VC protocol to add the necessary bandwidth on-demand. Recall that the VC protocol allows traffic between a pair of nodes to be carried on multiple, diverse paths. BWL-VC is based on a presumption that if the bandwidth on path P is required to increase in a later iteration, the algorithm will be able to find alternate diverse paths to support the growth.

The algorithm is identical to BWL in FIG. 7 except for Step 2a. In this case, instead of a single path $p_{i,j}$, the BWL-VC algorithm can use multiple paths to meet the bandwidth requirement bw. One can use different algorithms to determine these multiple paths: (1) by iteratively finding the successive shortest path; or (2) by a flow-based approach to push the required bandwidth and then extracting the paths from the flow graph. This embodiment of BWL-VC uses the first approach.

Note that since BWL-VC starts with the shortest path and moves to the next path only when the shortest does not have capacity left, it cannot produce a tree that is more expensive than BWL that uses a single path. If anything, it will find trees with lower cost since it can choose paths that only partially meet the bandwidth requirement whereas BWL will need to find a single, possibly longer path with the required capacity.

B. Two-Step Strategy (TS)

In this approach, the two problems of virtual tree design and routing of paths in the underlying transport are solved independently. Both of these problems are addressed in order.

Solving the first problem optimally may be done by finding an optimum communication spanning tree (OCST) over a complete graph consisting of only the EE nodes. While the general problem is NP-hard, it admits an optimal, polynomial solution, for example, as disclosed in T. C. Hu, "Optimum Communication Spanning Trees," SIAM Journal on Computing, vol. 3, September 1974, the disclosure of which is incorporated by reference herein, if all the link costs are unity. Indeed treating link (logical) costs as unity is reasonable since the cost to connect the various EE nodes is dependent on the routing at the SONET layer and not known at this stage. Thus, Hu's algorithm may be used to solve the tree design problem. Since Hu's algorithm is well known to those skilled in the art, only a brief summary of the algorithm is mentioned herein.

In accordance with Hu's algorithm, a flow equivalent tree (cut-tree) is found for the network of nodes where edges are defined by pairwise traffic demands. The tree computed in this fashion has the property that it requires minimum number of STS-1 circuits to be setup, a desirable property from the customer viewpoint.

Given a tree, the next stage involves simultaneously routing $|V'|-1$ circuits on the SONET transport. This problem maps to the multi-commodity flow problem. If each logical tree hop maps to a single path, one needs to solve the unsplittable version of the problem. If VC can be used to perform diverse routing, then one needs to solve the multi-commodity flow problem with integer splitting. Both of these problems are known to be NP-hard. While one can use various approximation algorithms for these problems (for example, as described in T. Radzik, "Fast Deterministic Approximation for the Multicommodity Flow Problem," SODA, pp. 486-492, 1995, the disclosure of which is incorporated by reference herein), a greedy strategy is employed in one embodiment to route individual adjacencies in order of their bandwidth requirement. The routing can be restricted to a single path (TS) or could be allowed to use multiple routes that leverage VC (TS-VC).

IV. ILP Formulation

In this section, a path based Integer Linear Programming (ILP) formulation of the BEST problem in a network is presented with and without VC capability.

The ILP algorithm is as follows. Given the graph G as in Section II-A, compute a set of routes between all pair of nodes in V'. Split each route k between i, j into two directed arcs (k, i, j) and (k, j, i) and represent this set by R'. The cost $C'_{k,i,j}$ of each arc is the sum of all constituent link costs. Let $L_l$ represent the set of all arcs that use the link l and P be the set of all EE node pairs that have a non zero demand between them. Note that there is exactly one bi-directional demand $d_{i,j}$ between the EE node pair (i,j). The ILP operates on the digraph G'(V', R',D, C').

Now, define variable $F_{k,i,j}^{m,n}$ as the amount of flow carried on an arc (k, i, j) for the node pair (m, n) and binary variable $U_{k,i,j}$ such that it is 1 if the arc (k, i, j) belongs to the spanning tree and 0 otherwise.

$$\text{Min}\Sigma_{(k,i,j)\in R'}(C'_{k,i,j} * \Sigma_{(m,n)\in P} F_{k,i,j}^{m,n}) \qquad \text{Obj:}$$

$$\Sigma_{k,j} F_{k,n,j}^{m,n} - \Sigma_{k,j} F_{k,j,m}^{m,n} = d_{m,n}, \forall (m,n)\in P \qquad \text{C0:}$$

$$\Sigma_{k,j} F_{k,n,j}^{m,n} - \Sigma_{k,j} F_{k,j,n}^{m,n} = d_{m,n}, \forall (m,n)\in P \qquad \text{C1:}$$

$$\Sigma_{k,j} F_{k,t,j}^{m,n} - \Sigma_{k,j} F_{k,j,t}^{m,n} = 0, \forall t\in V'-\{m,n\} \forall (m,n)\in P \qquad \text{C2:}$$

$$\Sigma_{(k,i,j)\in L_l} \Sigma_{(m,n)\in P} F_{k,i,j}^{m,n} \leq b_l, \forall l\in A \qquad \text{C3:}$$

$$F_{k,i,j}^{m,n}/d_{m,n} \leq U_{k,i,j}, \forall (k,i,j)\in R', \forall (m,n)\in P \qquad \text{C4:}$$

$$F_{k,i,j}^{m,n}/d_{m,n} \leq U_{k,j,i}, \forall (k,i,j)\in R', \forall (m,n)\in P \qquad \text{C5:}$$

$$\Sigma_{(k,i,j)\in R'} U_{k,i,j} = (|V'|-1)\times 2 \qquad \text{C6:}$$

Constraints C0 and C1 define the flow at the source and destination nodes of each flow and C2 is the flow conservation constraint at all the other nodes. C3 ensures that the sum of all the flows on all the arcs using a link is less than or equal to the capacity of that link. Note that since both links and demands are bidirectional the link capacity is used symmetrically. Constraints C4 and C5 ensure that each arc that has flow on it and its corresponding arc in the reverse direction are part of the solution. By restricting the number of arcs used to $(|V'|-1)\times 2$ constraint C6 ensures that the virtual topology is a tree spanning all EE nodes. The objective minimizes the bandwidth-cost product of the solution. This formulation is called ILP.

The above formulation allows exactly one bi-directional arc between a pair of EE nodes but since VC allows flow splitting, this constraint can be relaxed to allow the flow between a pair of logically adjacent EE nodes to be carried on multiple arcs forming a VCG. Hence, the variable $U_{(k,i,j)}$ is replaced by binary variable $E_{(i,j)}$ which is set to 1 if the EE node i is directly connected to j by a VCG in the solution and 0 otherwise. Note that since VC allows only integer flows on each component, the set $\{F_{k,i,j}^{m,n}\}$ is now restricted to integer values. Replacing constraints C4-C6 by C7-C9 gives the ILP-VC formulation.

$$F_{k,i,j}^{m,n}/d_{m,n} \leq E_{i,j}, \forall (k,i,j)\in R', \forall (m,n)\in P \qquad \text{C7:}$$

$$F_{k,i,j}^{m,n}/d_{m,n} \leq E_{j,i}, \forall (k,i,j)\in R', \forall (m,n)\in P \qquad \text{C8:}$$

$$\Sigma_{(i,j)\in V'\times V'} E_{i,j} = (|V'|-1)*2 \qquad \text{C9:}$$

V. Illustrative Hardware Implementation

Referring now to FIG. 10, a block diagram illustrates a generalized hardware architecture of a computer system suitable for implementing a system for generating a spanning tree in an optical-based network, according to an embodiment of the present invention. More particularly, it is to be appreciated that computer system 1000 in FIG. 10 may be used to implement and perform the algorithms of the invention, as illustratively described above in the context of FIG. 1A through FIG. 9. Also, it is to be understood that one or more network elements may implement such a computing system 1000. Of course, it is to be understood that the invention is not limited to any particular computing system implementation.

It is to be further understood that computing system 1000 may be implemented in one or more of the network elements (e.g., nodes) that route network traffic, in a network element that is dedicated to computing spanning trees, or some combination thereof.

Thus, computing system 1000 could be used to determine a spanning tree solution in accordance with the algorithms of the invention described herein such that the spanning tree plan could then be implemented on the subject network.

In this illustrative implementation, a processor 1002 for implementing at least a portion of the methodologies (algorithms) of the invention is operatively coupled to a memory 1004, input/output (I/O) device(s) 1006 and a network interface 1008 via a bus 1010, or an alternative connection arrangement. It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices.

The term "memory" as used herein is intended to include memory and other computer-readable media associated with a processor or CPU, such as, for example, random access memory (RAM), read only memory (ROM), fixed storage media (e.g., hard drive), removable storage media (e.g., diskette), flash memory, etc.

In addition, the phrase "I/O devices" as used herein is intended to include one or more input devices (e.g., keyboard, mouse, etc.) for inputting data to the processing unit, as well as one or more output devices (e.g., CRT display, etc.) for providing results associated with the processing unit. It is to be appreciated that such input devices may be one mechanism for a user to provide inputs used by a system of the invention to generate spanning tree solutions. Alternatively, the inputs could be read into the system from a diskette or from some other source (e.g., another computer system) connected to the computer bus 1010. Thus, inputs to the methodologies may be obtained in accordance with the one or more input devices. The output devices may be one mechanism for a user or other computer system to be presented with results of the methodologies of the invention.

Still further, the phrase "network interface" as used herein is intended to include, for example, one or more devices capable of allowing the computing system 1000 to communicate with other computing systems. Thus, the network interface may comprise a transceiver configured to communicate with a transceiver of another computer system via a suitable communications protocol. It is to be understood that the invention is not limited to any particular communications protocol.

It is to be appreciated that while the present invention has been described herein in the context of networks, the methodologies of the present invention may be capable of being distributed in the form of computer readable media, and that the present invention may be implemented, and its advantages realized, regardless of the particular type of signal-bearing media actually used for distribution. The term "computer readable media" as used herein is intended to include recordable-type media, such as, for example, a floppy disk, a hard disk drive, RAM, compact disk (CD) ROM, etc., and transmission-type media, such as digital or analog communication links, wired or wireless communication links using transmission forms, such as, for example, radio frequency and optical transmissions, etc. The computer readable media may take the form of coded formats that are decoded for use in a particular data processing system.

Accordingly, one or more computer programs, or software components thereof, including instructions or code for performing the methodologies of the invention, as described herein, may be stored in one or more of the associated storage media (e.g., ROM, fixed or removable storage) and, when ready to be utilized, loaded in whole or in part (e.g., into RAM) and executed by the processor 1002.

In any case, it is to be appreciated that the techniques of the invention, described herein and shown in the appended figures, may be implemented in various forms of hardware, software, or combinations thereof, e.g., one or more operatively programmed general purpose digital computers with associated memory, implementation-specific integrated circuit(s), functional circuitry, etc. Given the techniques of the invention provided herein, one of ordinary skill in the art will be able to contemplate other implementations of the techniques of the invention.

Although illustrative embodiments of the present invention have been described herein with reference to the accompanying drawings, it is to be understood that the invention is not limited to those precise embodiments, and that various other changes and modifications may be made by one skilled in the art without departing from the scope or spirit of the invention.

We claim:

1. A method of generating a spanning tree for use in forwarding Ethernet-based data in a circuit-switched network comprising a set of Ethernet-enabled nodes and a set of non-Ethernet-enabled nodes, comprising the steps of:
    obtaining input information, the input information comprising a representation of the network, the set of Ethernet-enabled nodes in the network, and a set of demands;
    computing a spanning tree of the set of Ethernet-enabled nodes based on at least a portion of the input information such that the spanning tree substantially satisfies one or more performance requirements associated with the set of demands; and
    determining, based on the computed spanning tree, one or more physical routes in the circuit-switched network comprising at least a portion of the Ethernet-enabled nodes and at least a portion of the non-Ethernet-enabled nodes for use in forwarding at least a portion of the Ethernet-based data;
    wherein the spanning tree computation and the route determination are performed such that the computed spanning tree satisfies pairwise bandwidth requirements and, given the computed spanning tree that satisfies the pairwise bandwidth requirements, one or more feasible circuits in the circuit-switched network are identified for routing the Ethernet-based data.

2. The method of claim 1, wherein the spanning tree computation and the route determination are performed in one integrated step.

3. The method of claim 2, wherein the integrated spanning tree computation/route determination step further comprises:
    selecting a starting node from among the Ethernet-enabled nodes as a starting node;
    selecting another node from among the Ethernet-enabled nodes to attach to the starting node; and
    selecting a path in the network to connect the starting node and the other node.

4. The method of claim 3, wherein the integrated spanning tree computation/route determination step further comprises iteratively selecting one or more next nodes and corresponding paths to include in the spanning tree.

5. The method of claim 3, wherein the node with the largest aggregate data traffic associated therewith is selected as the starting node.

6. The method of claim 3, wherein the integrated spanning tree computation/route determination step further comprises selecting nodes such that the path between the nodes is the shortest path that satisfies a given bandwidth requirement.

7. The method of claim 3, wherein the integrated spanning tree computation/route determination step further comprises selecting nodes that have the least bandwidth-length to bandwidth ratio.

8. The method of claim 3, wherein the integrated spanning tree computation/route determination step further comprises utilizing a virtual concatenation (VC) protocol to allow the Ethernet-based data associated with the set of demands to be forwarded on multiple, diverse paths.

9. The method of claim 1, wherein the spanning tree computation and the route determination are performed in separate steps.

10. The method of claim 9, wherein the separate spanning tree computation step further comprises finding an optimal communication spanning tree over a graph comprising the Ethernet-enabled nodes.

11. The method of claim 9, wherein the separate route determination step further comprises solving a multi-commodity flow problem.

12. The method of claim 9, wherein the separate route determination step further comprises utilizing a virtual concatenation (VC) protocol to allow the Ethernet-based data associated with the set of demands to be forwarded on multiple, diverse paths.

13. The method of claim 1, wherein the one or more performance requirements associated with the set of demands comprise one of more bandwidth requirements.

14. A method of generating a spanning tree for use in forwarding Ethernet-based data in a circuit-switched network comprising a set of Ethernet-enabled nodes and a set of non-Ethernet-enabled nodes, comprising the steps of:
obtaining input information, the input information comprising a representation of the network, the set of Ethernet-enabled nodes in the network, and a set of demands;
computing a spanning tree of the set of Ethernet-enabled nodes based on at least a portion of the input information such that the spanning tree substantially satisfies one or more performance requirements associated with the set of demands; and
determining, based on the computed spanning tree, one or more physical routes comprising at least a portion of the Ethernet-enabled nodes and at least a portion of the non-Ethernet-enabled nodes for use in forwarding at least a portion of the Ethernet-based data, wherein the spanning tree computation and the route determination are performed in one integrated step;
wherein the integrated spanning tree computation/route determination step further comprises:
selecting a starting node from among the Ethernet-enabled nodes as a starting node;
selecting another node from among the Ethernet-enabled nodes to attach to the starting node;
selecting a path in the network to connect the starting node and the other node; and
providing excess bandwidth when accounting for the set of demands.

15. The method of claim 14, wherein traffic is divided into a tree bandwidth component and an excess bandwidth component, wherein the excess bandwidth component is tunable based on a subscription factor.

16. Apparatus for use in generating a spanning tree for use in forwarding Ethernet-based data in a circuit-switched network comprising a set of Ethernet-enabled nodes and a set of non-Ethernet-enabled nodes, comprising:
a memory; and
at least one processor coupled to the memory and operative to: (i) obtain input information, the input information comprising a representation of the network, the set of Ethernet-enabled nodes in the network, and a set of demands; (ii) compute a spanning tree of the set of Ethernet-enabled nodes based on at least a portion of the input information such that the spanning tree substantially satisfies one or more performance requirements associated with the set of demands; and (iii) determine, based on the computed spanning tree, one or more physical routes in the circuit-switched network comprising at least a portion of the Ethernet-enabled nodes and at least a portion of the non-Ethernet-enabled nodes for use in forwarding at least a portion of the Ethernet-based data; wherein the spanning tree computation and the route determination are performed such that the computed spanning tree satisfies pairwise bandwidth requirements and, given the computed spanning tree that satisfies the pairwise bandwidth requirements, one or more feasible circuits in the circuit-switched network are identified for routing the Ethernet-based data.

17. The apparatus of claim 16, wherein the circuit-switched network comprises one of a Synchronous Optical Network (SONET) and a Synchronous Digital Hierarchy (SDH) network.

18. The apparatus of claim 16, wherein the circuit-switched network is configured to provide at least one of Ethernet-over-SONET (EoS) services and Ethernet Local Area Network (E-LAN) services.

19. An article of manufacture comprising a non-transitory machine-readable storage medium storing one or more programs for generating a spanning tree for use in forwarding Ethernet-based data in a circuit-switched network comprising a set of Ethernet-enabled nodes and a set of non-Ethernet-enabled nodes, the one or more programs when executed in a processor implementing a method comprising the steps of:
obtaining input information, the input information comprising a representation of the network, a set of Ethernet-enabled nodes in the network, and a set of demands;
computing a spanning tree of the set of Ethernet-enabled nodes based on at least a portion of the input information such that the spanning tree substantially satisfies one or more performance requirements associated with the set of demands; and
determining, based on the computed spanning tree, one or more physical routes in the circuit-switched network comprising at least a portion of the Ethernet-enabled nodes and at least a portion of the non-Ethernet-enabled nodes for use in forwarding at least a portion of the Ethernet-based data;
wherein the spanning tree computation and the route determination are performed such that the computed spanning tree satisfies pairwise bandwidth requirements and, given the computed spanning tree that satisfies the pairwise bandwidth requirements, one or more feasible circuits in the circuit-switched network are identified for routing the Ethernet-based data.

* * * * *